United States Patent [19]

Garrett et al.

[11] 4,088,206

[45] May 9, 1978

[54] CLEARANCE SENSING BRAKE ADJUSTER

[75] Inventors: Wayne H. Garrett, Troy; Theodore H. Stringer, III; Ted Zbikowski, both of Southfield, all of Mich.

[73] Assignee: Eaton Corporation, Cleveland, Ohio

[21] Appl. No.: 783,259

[22] Filed: Mar. 31, 1977

[51] Int. Cl.$^2$ ............................................. F16D 65/56
[52] U.S. Cl. ............................ 188/196 D; 188/79.5 K
[58] Field of Search ....... 188/79.5 K, 196 D, 196 BA

[56] References Cited

U.S. PATENT DOCUMENTS

| | | | |
|---|---|---|---|
| 3,507,369 | 4/1970 | Oliver | 188/196 BA |
| 3,949,840 | 4/1976 | Cumming et al. | 188/196 BA X |
| 3,997,036 | 12/1976 | Zeidler | 188/196 BA X |

*Primary Examiner*—Duane A. Reger

*Attorney, Agent, or Firm*—Robert J. McCloskey; Howard D. Gordon; Paul S. Rulon

[57] ABSTRACT

An automatic clearance adjuster for a cam actuated vehicle brake. The adjuster is disposed in a pivotal lever and includes a worm and worm gear, an adjusting mechanism for effecting a clearance decreasing rotation of the worm during the brake apply stroke and a clearance increasing rotation of the worm during the brake release stroke, a two-way torque limiting ratchet clutch which slips to prevent rotation of the worm by the adjusting mechanism when the shoes are in contact with the drum, and a roller clutch which allows a predetermined amount of clearance increasing rotation of the worm by the adjusting mechanism during the brake release stroke and then locks up and causes slippage of the torque limiting clutch to prevent further clearance increasing rotation of the worm.

37 Claims, 5 Drawing Figures

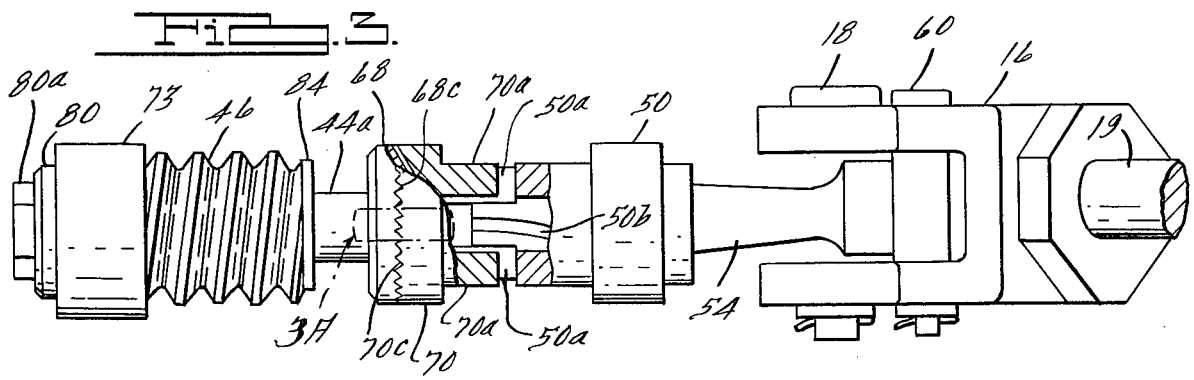
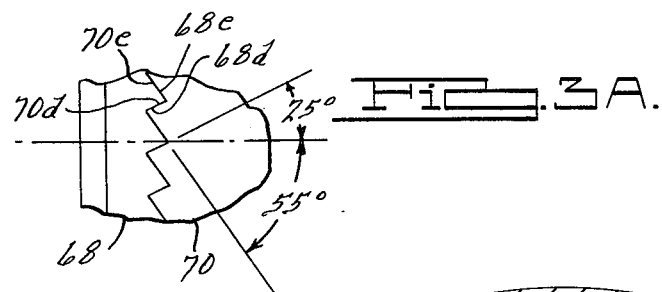
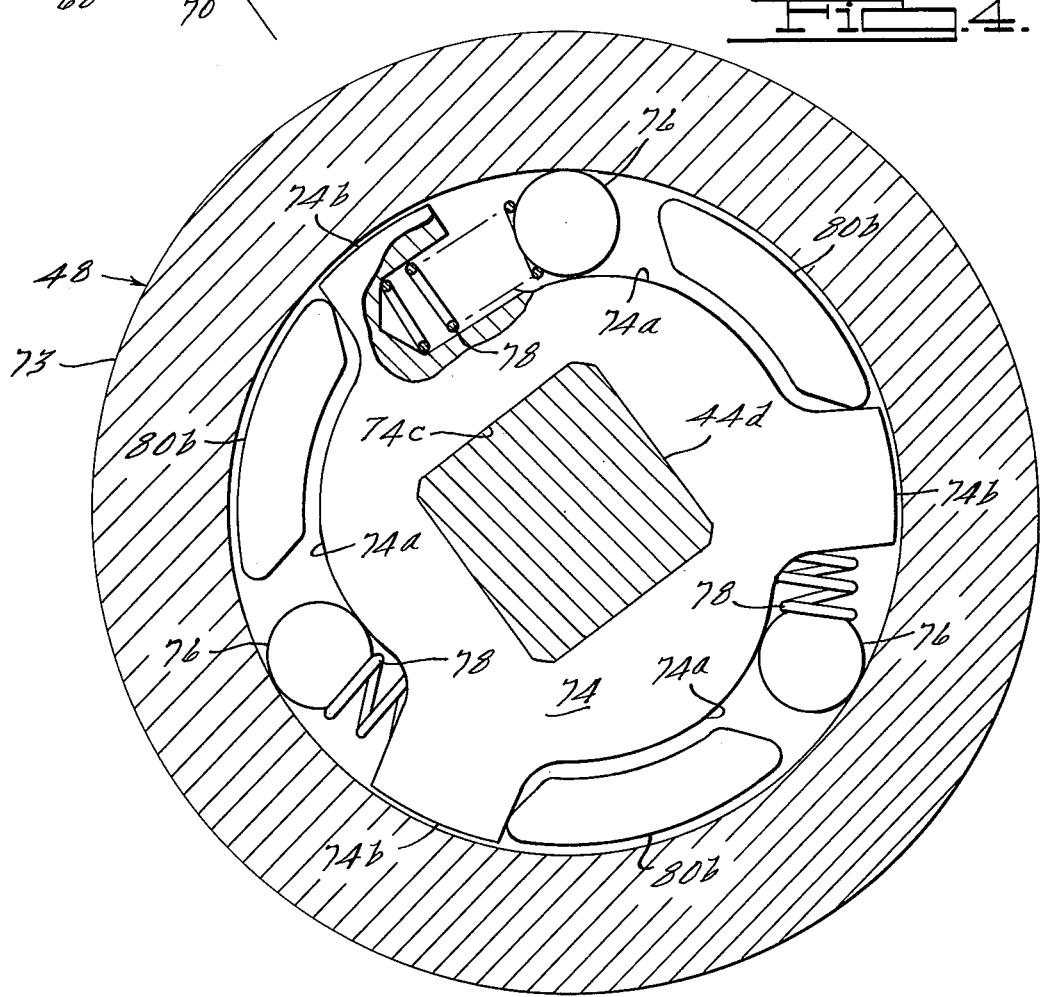

CLEARANCE SENSING BRAKE ADJUSTER

CROSS-REFERENCE

This application relates to pending U.S. application Ser. No. 783,258 filed Mar. 31, 1977 and assigned to the assignee of this application.

BACKGROUND OF THE INVENTION

1. Field of the Invention

The invention relates to an automatic clearance adjuster for a brake or clutch and more specifically to such an adjuster of a cam actuated vehicle brake.

2. Description of the Prior Art

Automatic clearance adjusters employing means to prevent over adjustment of a vehicle brake due to elastic deformation in the brake assembly are well known. Such adjusters are said to be "clearance sensing adjusters" which distinguish between the two parts of any brake stroke, i.e., the clearance or first part of the brake stroke requiring relatively low brake actuating forces for moving the brake shoes to or from the drum and the second part requiring relatively high brake actuating forces for stopping the vehicle. An adjusting mechanism in the adjuster automatically makes a clearance decreasing adjustment when the first part of the stroke exceeds a predetermined amount. The adjusting mechanism is blocked out or prevented from making a clearance decreasing adjustment during the second part of the stroke. The second part of the stroke is often larger than the first part due to the high actuating forces causing deformation in the brake system and therefore can quickly over adjust the brake if the adjusting mechanism is not blocked out. One clearance sensing adjuster, disclosed in U.S. Pat. No. Re. 26,965, employs a disengaging clutch which physically disengages an adjusting mechanism in response to the high brake actuating forces. Another such adjuster, disclosed in U.S. Pat. No. 3,507,369, employs a spring clutch which slips in response to the high brake actuating forces. The clutches employed in these adjusters require a rather high degree of quality control in manufacture and assembly.

Further, the mentioned adjusters provide only for clearance decreasing adjustments in response to the first part of the stroke exceeding a predetermined amount. However, the first part of the brake stroke, i.e., the running clearance, may be temporarily increased when the brake drum thermally expands, whereby the mentioned clearance sensing adjusters will over adjust the brake. An adjuster for automatically increasing and decreasing the clearance of an improperly adjusted brake is disclosed in U.S. Pat. No. 3,990,546. However, this adjuster can not distinguish between the two parts of the brake stroke as do the previously mentioned adjusters employing either the disengaging clutch or the spring clutch.

SUMMARY OF THE INVENTION

An object of the invention is to provide an automatic clearance sensing adjuster operative to make clearance decreasing and increasing adjustments for maintaining a predetermined running clearance between two relatively movable members in response to engagement of the members.

Another object of the invention is to provide such an adjuster having an improved force limiting clutch.

According to a feature of the invention, the adjuster includes an adjusting means for making clearance decreasing and increasing adjustments to an adjustable means for controlling the running clearance between two relatively movable members which are engaged and disengaged in response to movement of an actuator; a force limiting means operative to prevent the adjustment when the force for moving the adjustable means exceeds a predetermined limit; and a device operative when the actuator moves in one direction, to allow a variable amount of clearance adjustment in one direction and operative when the actuator moves in the other direction, to allow a predetermined amount of clearance adjustment in the other direction and thereafter prevent adjustment in the other direction while the actuator continues to move in the other direction.

According to a further feature of the invention, the force limiting means comprises a two-way force limiting ratchet clutch.

BRIEF DESCRIPTION OF THE DRAWINGS

The preferred embodiment of the invention is shown in the accompanying drawings in which:

FIGS. 3 and 3A illustrate further details of the adjuster of FIG. 2; and

FIG. 4 is a section view taken along line 4—4 of FIG. 2.

DETAILED DESCRIPTION OF THE PREFERRED EMBODIMENT

Figures 1, 2:
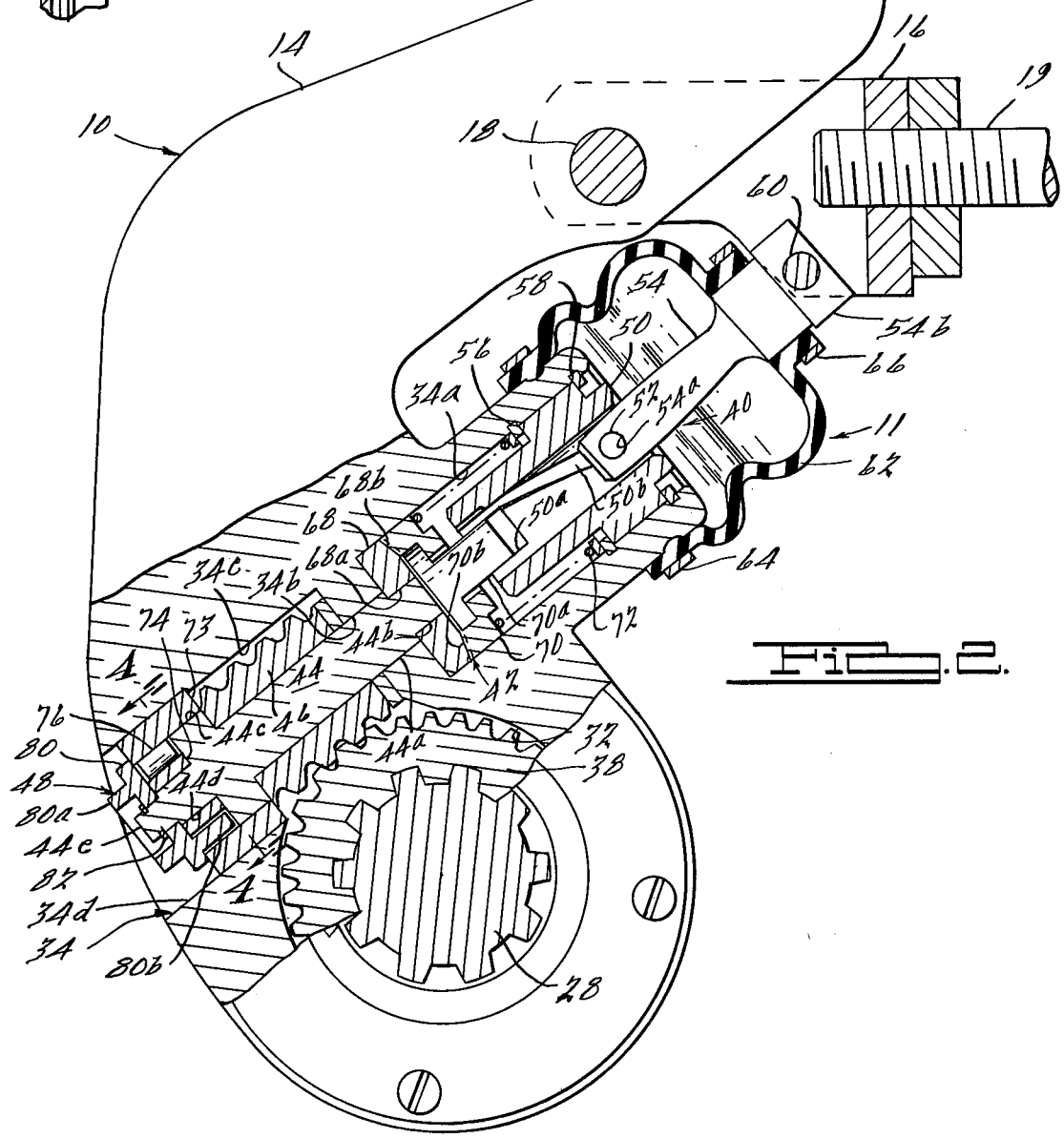
FIG. 1 illustrates a cam actuated brake and an actuator therefor with the invention adjuster disposed therein.
FIG. 2 is a partially broken away view of the actuator and adjuster of FIG. 1.

Referring now to FIG. 1, therein is shown a brake actuator 10 and automatic clearance adjuster 11 for a brake assembly 12 of a truck type vehicle. Actuator 10 includes an L-shaped lever 14 which is pivotally connected to a clevis 16 via a pin 18. Clevis 16 is in turn connected to a rod 19 which moves axially to the left to apply the brake in response to pressurized fluid acting on an unshown diaphragm in an air motor 20.

The brake assembly 12 includes a pair of friction members or brake shoes 22 which are moved radially outward into frictional contact with a rotating member or brake drum 24 in response to counterclockwise rotation of an s-cam 26 formed on or fixed to one end of a shaft 28. The other end of shaft 28 is splined to actuator 10, see FIG. 2. Hence, pressurized fluid in motor 20 provides a force for moving rod 19 to the left and effecting a counterclockwise rotation of lever 14 and s-cam 26 about the axis of shaft 28. A spring 30 applies a force for retracting the brake shoes and an unshown spring in air motor 20 provides a force for retracting rod 19 when the pressurized fluid is removed. Brake assembly as thus far described is well known.

In a brake system, such as shown herein, wear of the brake frictional surface defined by shoes 22 and drum 24 increases the running clearance therebetween. Uncorrected, the increasing clearance will require an increased brake stroke or pivotal rotation of lever 14 to move the brake shoes into frictional engagement with the brake drum. The disadvantages of not correcting the increasing clearance are well known and include: (1) loss of effective brake actuating force due to over stretching of the air motor diaphragm, (2) unbalanced vehicle braking should the brakes on different wheels and/or on different axles wear at different rates, (3) increased amount of pressurized air to apply the brake, (4) increased time to move the brake shoes into contact with the drum, etc.

Many brake adjusters have been devised which automatically decrease the clearance between the brake shoes and the brake drum if the total brake stroke exceeds a predetermined amount. Such adjusters, commonly called stroke sensing adjusters, can over adjust the brakes unless they provide for a relatively large amount of normal or running clearance to allow for elastic deformation in the brake system during severe brake applications and to allow for thermal expansion of a hot brake drum.

Several automatic adjusters have been devised which sense the two parts of any total brake stroke, i.e., a first part requiring a relatively small brake actuating force to move the brake shoes into contact with the brake drum and a second part requiring a relatively large amount of brake actuating force for stopping the vehicle after the shoes have contacted the drum. The second part of the brake stroke is responsible for the mentioned elastic deformation and is often larger than the first part of the brake stroke. These adjusters, commonly called clearance sensing adjusters, employ either a disengaging clutch or torque limiting clutch in the adjuster mechanism, which clutches respectively disengage or slip in response to the relatively large actuating forces in the second part of the brake stroke to prevent clearance adjustment when the shoes are in contact with the drum. Such adjusters include or have built therein a predetermined amount of lost motion for establishing the running or normal clearance of the brake. In such adjusters, clearance is decreased if the lost motion is taken up before the shoes contact the drum.

The automatic clearance adjuster disclosed hereinafter employs an improved torque limiting clutch for sensing the two parts of the brake stroke and a roller clutch. The roller clutch allows the clearance to be increased should the clearance become too small for any reason.

The structure and operation of actuator 10 and clearance adjuster 11 is more clearly shown in the partially broken away view of lever 14 in FIG. 2 and in FIGS. 3 and 3A. FIG. 3 is rotated 90° with respect to FIG. 2. Lever 14 includes through bores 32 and 34 for housing portions of the clearance adjuster. Bore 32 rotatably supports a worm gear 38 which is splined to shaft 28. Bore 34 is defined by coaxial bore portions 34a, 34b, 34c, and 34d. Bore portion 34a houses an adjusting assembly 40 and a two way torque limiting ratchet clutch 42. Bore portion 34b provides rotational support for one end portion 44a of a worm shaft 44. The extreme end of portion 44a defines a square drive portion 44b. Bore portion 34c houses a worm 46 in mesh with worm gear 38 and fixed to rotate with worm shaft 44. Bore portion 34d houses a roller clutch 48 which is integrally formed with the other end of worm shaft 44 defined by an enlarged round portion 44c, a squared portion 44d and a necked down round portion 44e.

Adjusting assembly 40 includes a cylindrical sleeve member 50 having a slotted end 50a and a pair of internal helical grooves 50b which drivingly and loosely receive the ends of a pin 52 pressed through a hole 54a in a drive member 54. Sleeve 50 is rotatably supported by bore 34a and is retained therein against axial movement by snap rings 56 and 58. Drive member 54 includes a head portion 54b pivotally secured to clevis 16 by a pin 60 which also loosely retains member 54 against rotation about its axis. Pivotal movement of lever 14 in a counterclockwise direction, to apply the brake, axially moves drive member 54 further into sleeve 50 and effects a rotation of the sleeve in one direction due to the cooperation between pin 52 and helical grooves 50b. Pivotal movement of lever 14 in a clockwise direction, to release the brake, axially moves or retracts the drive member and effects a rotation of sleeve 50 in the opposite direction. The adjusting assembly is sealed against foreign matter by a rubber boot 62 which is secured to lever 14 and drive member 54 by clamps 64 and 66.

Torque limiting ratchet clutch 42 includes an annular clutch member 68 rotatably seated against a shoulder defined by the difference in diameter between bore portions 34a and 34b, an annular clutch member 70, and a spring 72 for biasing clutch members 68 and 70 into engagement with a substantially constant force. Clutch member 68 includes a square opening 68a which snugly receives square drive portion 44b of worm shaft 44 and a convex frusto-conical face 68b having a set of asymetric teeth 68c circumferentially arrayed thereon, see FIG. 3. Clutch member 70 includes a pair of tangs 70a which are loosely received in slot 50a of sleeve 50 and a concave frusto-conical face 70b matable with face 68b and having a set of asymetric teeth 70c circumferentially arrayed thereon and mating with teeth 68c, see FIG. 3. Looking momentarily at FIG. 3A, each tooth 68c includes a high torque drive face 68d inclined at about 25 degrees with respect to the rotational axis of the clutch and a low torque drive face 68e inclined at about 55° with respect to the axis. Teeth 70c include drive faces 70d and 70e which mate, respectively, with drive faces 68d and 68e.

As may be seen from the configuration of ratchet teeth 68c and 70c, clutch 42 has a high torque capacity or limit in the clearance decreasing direction, when drive is through high torque drive faces 68d and 70d, during brake application, and a low torque capacity or limit in the clearance increasing direction when drive is through low torque drive faces 68e and 70e during brake release. The greater torque capacity in the clearance decreasing direction of the disclosed adjuster is needed since the teeth of worm 46 move in an up ramp direction with respect to the teeth of worm gear 38, since s-cam 26 moves in an up ramp direction, and since the force of shoe retraction spring 30 works through the ramps to oppose rotation of the worm. The ramps and spring 30 assist worm rotation in the clearance increasing direction. The ratchet teeth could of course be made symetrical, but this would require a higher capacity roller clutch 48 or device to prevent rotation in the clearance increasing direction. The biasing force of spring 72 is substantially constant and independent of the pivotal position of lever 14 or the axial position of drive member 54. Further, the torque capacity of the ratchet clutch is easily maintained within prescribed limits.

Looking now at FIGS. 2 and 4, roller clutch 48 includes an outer race 73 pressed into bore portion 34d, an inner race 74 having three cam surfaces 74a separated by three radially extending rib portions 74b and a squared opening 74c which fits snugly over squared portion 44d of worm shaft 44, three rollers 76 which wedge between the cam surface 74a and the inner surface of outer race to lock-up the clutch, three springs 78 carried by ribs 74b and biasing the rollers up the ramps of cam surfaces 74a, and an end plate 80 rotatably supported on necked down portion 44e of worm shaft 44 and retained thereon by a snap ring 82. It may be seen from the foregoing that clutch member 68 and inner race 74 are locked together via worm shaft 44. Hence, roller clutch lock-up prevents rotation of worm 46 and clutch member 68. Plate 80 allows manual clearance adjustment of the brakes and includes for this purpose a hex head 80a and three fingers 80b interposed between rollers 76 and ribs 74b to facilitate free clockwise and counterclockwise rotation of the inner race and worm 46 in response to rotation of the hex head by a wrench. Outer race 73 provides an end stop for worm 46 and a bearing surface for enlarged portion 44c of worm shaft 44. Roller clutch 48 is free running when worm 46 is being turned in the clearance decreasing direction by ratchet clutch 42 and locks-up when the ratchet clutch attempts to rotate the worm in the clearance increasing direction. However, inner race 74 has to rotate a few angular degrees before rollers 76 can wedge between the outer race and cam surfaces 74a to lock-up the roller clutch. This small amount of angular rotation or hysteresis in the roller clutch allows the ratchet clutch to rotate worm 46 a predetermined amount in the clearance increasing direction each time the brakes are released, thereby providing an automatic clearance increasing adjustment of the brake.

When the shoe to drum clearance is within predetermined limits, a clearance increasing and decreasing equilibrium will be established by the adjuster, i.e., the adjuster will make a small clearance decreasing adjustment during each brake application stroke and a substantially equally small clearance increasing adjustment during each brake release stroke. When the shoe to drum clearance is greater than the predetermined limits, the torque limiting clutch allows each clearance decreasing adjustment to increase relative to each clearance increasing adjustment until the clearance is within limits. When the shoe to drum clearance is less than the predetermined limits, the torque limiting clutch allows each clearance decreasing adjustment to diminish relative to each clearance increasing adjustment until the clearance is again within limits.

During the first part of the brake apply stroke, lever 14 rotates counterclockwise about the axis of shaft 28 and carries therewith worm 46 and worm gear 38. The worm reacts through a thrust bearing 84 against a shoulder defined by the difference in diameter between bore portions 34b and 34c. Drive member 54 moves axially in sleeve 50, rotates clutch member 70 after small clearances defined by the loose fits between pin 60 and clevis 16, between pin 52 and grooves 50b, and between slot 50a and tangs 70a are taken up. These small clearances provide a lost motion for establishing the normal or predetermined running clearance between shoes 22 and drum 24. When the lost motion is taken up, sleeve 50 rotates clutch member 70 which applies a torque through the high torque drive face for rotating worm 46 relative to lever 14 and decreasing the shoe to drum clearance.

During the first part of the brake apply stroke and if the brake is adjusted within limits, the lost motion will be taken up shortly before shoes 22 contact drum 24, thereby allowing a small or incremental rotation of worm 46 and clutch member 68 by clutch member 70 until the shoes contact the drum. Continued counterclockwise rotation of lever 14, i.e., the second part of the brake stroke, causes an abrupt increase in reaction forces throughout the actuator and the brake assembly. These forces react at the interface of the worm and worm gear teeth and quickly raise the torque required to rotate the worm to a level above the torque or force limit of clutch 42, whereby teeth 70c ratchet or slip over teeth 68c during the remainder of the second part of the brake stroke. If the shoe to drum clearance is greater than the predetermined limit, the length of the first part of the brake stroke increases in proportion to the excess clearance, thereby increasing the amount of each incremential clearance decreasing rotation of worm 46. If the shoe to drum clearance is less than the predetermined limit, the length of the first part of the brake stroke decreases in proportion to the insufficient clearance, thereby decreasing the amount of each incremential clearance decreasing rotation of worm 46.

During the brake release stroke, the lost motion is first taken up in the reverse direction, the low torque drive face of teeth 70c then ratchet over the low torque drive faces of teeth 68c until the brake shoes move out of contact with the drum, clutch 42 then rotates the worm a maximum predetermined or fixed incremential amount until the hysteresis in roller clutch 48 is taken up, and the roller clutch then locks-up and applies a counter torque to worm shaft 44 in excess to the low torque limit of clutch 42 in the clearance increasing direction. Each fixed incremential clearance increasing rotation of worm 46 will be greater than each incremential clearance decreasing rotation of the worm while the shoe to drum clearance is less than the predetermined limit, will be substantially the same as each clearance decreasing increment while the shoe to drum clearance is within limits, and will be less than each clearance decreasing increment while the shoe to drum clearance is greater than the predetermined limit. Hence, adjuster 11 provides a variable clearance decreasing adjustments and maximum predetermined or fixed clearance increasing adjustments in response to brake applications and releases respectively.

The preferred embodiment of the invention has been disclosed for illustration purposes. Many variations and modifications of the preferred embodiment are believed to be within the spirit of the invention disclosed. For example, the means for effecting clearance decreasing adjustments, i.e., sleeve 50 and ratchet clutch 42, may be used in combination with other means to inhibit, prevent, or control rotation of worm 46 in the clearance increasing direction. Such devices could be a spring such as the Belleville spring as shown in U.S. Pat. No. 3,507,369, a spring clutch such as shown in U.S. Pat. No. 3,907,357, or a ratchet device similar to ratchet clutch 42 as shown herein. Further, the roller clutch may be used in combination with other types of torque limiting devices, e.g., the spring clutch as shown in U.S. Pat. No. 3,507,369. The following claims are intended to cover the inventive portions relating to a clearance sensing adjuster having means for effecting clearance increasing adjustments and variations and modifications believed to be within the spirit of this invention.

What is claimed is:

1. An adjuster for automatically controlling clearance within predetermined limits between first and second relatively moveable friction members which are engaged to diminish such relative movement in response to movement of actuator means in one direction and which are disengaged to allow such relative movement in response to movement of the actuator means in another direction, said adjuster comprising:

adjustable means moveable in a clearance decreasing direction and in a clearance increasing direction;

adjusting means for moving said adjustable means in said clearance decreasing direction in response to movement of said actuator means in one of said engaging and disengaging directions and in said clearance increasing direction in response to movement of said actuator means in the other of said engaging and disengaging directions;

force limiting means for preventing movement of said adjustable means by said adjusting means when the force required for moving said adjustable means exceeds the force limit of said force limiting means; and a device operative to allow a predetermined maximum amount of movement of said adjustable means in one of said clearance adjusting directions during a portion of actuator movement in one of said engaging and disengaging directions and therefore operative to apply a force in excess of said force limit during the remainder of the actuator movement in said one of said engaging and disengaging directions for preventing further movement of said adjustable means in said one of said clearance adjusting directions.

2. The adjuster of claim 1, wherein said force limiting means comprises a two-way force limiting clutch having a greater force limit in one drive direction than in the other.

3. The adjuster of claim 2, wherein said operative device applies said force in excess when drive through said clutch is in the lower force direction.

4. The adjuster of claim 1, wherein said operative device comprises a roller clutch for applying said force in excess.

5. Adjuster of claim 1, wherein said force limiting means comprises a two-way force limiting ratchet clutch.

6. The adjuster of claim 5, wherein the force limit of said ratchet clutch is greater in one drive direction than in the other.

7. The adjuster of claim 6, wherein said operative device applies said force in excess when drive through said clutch is in the lower force direction.

8. The adjuster of claim 1, wherein said force limiting means comprises a two-way force limiting ratchet clutch and said operative device comprises a roller clutch for applying said force in excess.

9. The adjuster of claim 8, wherein the force limit of said ratchet clutch is greater in one drive direction than in the other.

10. The adjuster of claim 9, wherein said roller clutch applies said force in excess when drive through said ratchet clutch is in the lower force direction.

11. The adjuster of claim 1, wherein said adjusting means moves said adjustable means in said clearance decreasing direction in response to movement of said actuator means in the direction for engaging said friction members.

12. The adjuster of claim 11, wherein said force limiting means comprises a two-way force limiting clutch having a greater force limit in one drive direction than in the other.

13. The adjuster of claim 12, wherein said operative device applies said force in excess when drive through said clutch is in the lower force direction.

14. The adjuster of claim 12, wherein said operative device comprises a roller clutch operative to apply said force in excess which drive through said force limiting clutch is in the lower force direction.

15. An automatic clearance adjuster for controlling clearance within predetermined limits between first and second relatively rotatable friction members which are engaged and disengaged respectively to diminish and allow such relative rotation in response to pivotal movement of a lever defining a housing, said adjuster comprising:

a first gear rotatably disposed in said housing and adapted to move one of said friction members into said engagement and disengagement when rotated by said lever and adapted to adjust said clearance when rotated relative to said lever;

a second gear rotatably disposed in said housing and in mesh with said first gear, said second gear operative to adjustably lock said first gear to said lever for effecting said engagement and disengagement, and said second gear rotatable relative to said lever in clearance decreasing and increasing directions of rotation to respectively effect clearance decreasing and increasing rotation of said first gear;

adjusting means for effecting said clearance decreasing rotation of said second gear in response to pivotal movement of said lever in one direction and for effecting clearance increasing rotation of said second gear in response to pivotal movement of said lever in the other direction;

a torque limiting clutch for preventing said clearance decreasing and increasing rotation when the torque required to rotate said second gear relative to said lever exceeds the torque limit of said clutch; and a device operative to allow a predetermined maximum amount of clearance rotation of said second gear in one of said clearance adjusting directions during a portion of pivotal movement of said lever in one of said directions and thereafter operative to apply a torque in excess to the torque limit of said clutch for preventing further rotation of said second gear in said one of said clearance adjusting directions.

16. The adjuster of claim 15, wherein said torque limiting clutch comprises a two-way torque limiting clutch having a greater torque limit in one drive direction than in the other.

17. The adjuster of claim 16, wherein said operative device applies said torque in excess when drive through said clutch is in the lower torque direction.

18. The adjuster of claim 15, wherein said operative device comprises a roller clutch for applying said torque in excess.

19. The adjuster of claim 15, wherein said operative device comprises:

a roller clutch operative to allow said predetermined maximum amount of clearance rotation of said second gear and thereafter operative to lock-up and apply said torque in excess; and manual adjusting means operative to unlock said clutch, whereby said second gear may be manually rotated in said clearance decreasing and increasing directions.

20. The adjuster of claim 15, wherein said torque limiting clutch comprises a two-way torque limiting ratchet clutch.

21. The adjuster of claim 20, wherein said torque limit of said ratchet clutch is greater in one drive direction than in the other.

22. The adjuster of claim 21, wherein said operative device applies said torque in excess when drive through said clutch is in the lower torque direction.

23. The adjuster of claim 15, wherein said torque limiting clutch comprises a two-way torque limiting ratchet clutch and said operative device comprises a roller clutch for applying said torque in excess.

24. The adjuster of claim 23, wherein the torque limit of said ratchet clutch is greater in one drive direction than in the other.

25. The adjuster of claim 24, wherein said roller clutch applies said torque in excess when drive through said ratchet clutch is in the lower torque direction.

26. The adjuster of claim 15, wherein said adjusting means rotates said adjustable means in said clearance decreasing direction in response to pivotal movement of said lever in the direction for engaging said friction members.

27. The adjuster of claim 26, wherein said torque limiting clutch comprises a two-way torque limiting clutch having a greater torque limit in one drive direction than in the other.

28. The adjuster of claim 27, wherein said operative device applies said torque in excess when drive through said clutch is in the lower torque direction.

29. The adjuster of claim 27, wherein said operative device comprises a roller clutch operative to apply said torque in excess when drive through said torque limiting clutch is in the lower torque direction.

30. A brake clearance adjuster including a reciprocatingly pivotal lever defining a housing having first and second intermeshed gears disposed therein and a torque limiting clutch drivingly connected to said second gear, said second gear operative to rotate said first gear with said lever in response to said pivotal movement of said lever for applying and releasing the brake, said torque limiting clutch operative to reciprocatingly rotate said gears relative to said lever in response to said pivotal movement of said lever for effecting clearance decreasing and increasing adjustments of said brake when the torque required to rotate said gears is below the torque limit of said clutch, wherein the improvement comprises:

a device operative to allow a predetermined amount of rotation of said second gear in one direction relative to said lever by said clutch during a portion of said pivotal movement of said lever in one direction and thereafter operative to prevent such rotation of said second gear during continued pivotal movement of said lever in said one direction.

31. The brake adjuster of claim 30, wherein said device comprises a roller clutch operative to allow said predetermined amount of rotation of said second gear in said one direction and thereafter operative to lock-up and prevent said rotation in response to said predetermined amount of rotation of said second gear in said one direction.

32. The brake adjuster of claim 30, wherein said device comprises:

a roller clutch operative to allow said predetermined amount of rotation of said second gear in said one direction and thereafter operative to lock-up and prevent said rotation in response to said predetermined amount of rotation of said second gear in said one direction; and manual adjusting means operative to unlock said clutch, whereby said second gear may be manually rotated in either direction.

33. The brake adjuster of claim 30, wherein said torque limiting clutch comprises a two-way torque limiting clutch having a lower torque limit in the drive direction for rotating said second gear in said one direction.

34. The brake adjuster of claim 30, wherein said torque limiting ratchet clutch comprises a two-way torque limiting ratchet clutch.

35. The brake adjuster of claim 34, wherein the torque limit of said ratchet clutch is greater in one direction than in the other.

36. The brake adjuster of claim 35, wherein said device comprises a roller clutch operative in the low torque drive direction of said ratchet clutch to allow said predetermined amount of rotation of said second gear in said one direction and thereafter operative to lock-up and prevent said rotation in said one direction.

37. The brake adjuster of claim 36, wherein said ratchet clutch rotates said second gear in said clearance decreasing direction in response to pivotal movement of said lever in the brake apply direction.

* * * * *

UNITED STATES PATENT AND TRADEMARK OFFICE
CERTIFICATE OF CORRECTION

PATENT NO. : 4,088,206
DATED : May 9, 1978
INVENTOR(S) : Wayne H. Garrett; Theodore H. Stringer, III; Ted Zbikowski It is certified that error appears in the above-identified patent and that said Letters Patent are hereby corrected as shown below:

Col. 8, line 26: After "effecting" insert "said".

line 66: "said" should read "the".

Signed and Sealed this

Seventeenth Day of October 1978

[SEAL]

Attest:

RUTH C. MASON
Attesting Officer

DONALD W. BANNER
Commissioner of Patents and Trademarks